INVENTOR

TERUO KAWATA

BY

Mason, Fenwick & Lawrence

ATTORNEYS

INVENTOR

TERUO KAWATA

BY Mason, Fenwick & Lawrence

ATTORNEYS

Oct. 7, 1969 TERUO KAWATA 3,471,653

TRANSVERSELY SHIFTABLE TAPE SUPPORT FOR ENABLING MULTI-TRACK RECORDING OR READOUT

Filed March 22, 1966 3 Sheets-Sheet 3

INVENTOR

TERUO KAWATA

BY Mason, Fenwick & Lawrence

ATTORNEYS

United States Patent Office 3,471,653

Patented Oct. 7, 1969

3,471,653

TRANSVERSELY SHIFTABLE TAPE SUPPORT FOR ENABLING MULTI-TRACK RECORDING OR READOUT

Teruo Kawata, 59 Imaikecho, Nishinariku, Osaka, Japan

Filed Mar. 22, 1966, Ser. No. 536,440
Claims priority, application Japan, Mar. 24, 1965, 40/17,304, 40/17,305
Int. Cl. G11b 5/02
U.S. Cl. 179—100.2 5 Claims

ABSTRACT OF THE DISCLOSURE

A tape recording system having right and left guides movable for transversely shifting a tape being conveyed across a transducer in synchronization with the movement of the tape during recording with the guides being shiftable by a rotary disc cam rotated through a friction ring driven by a crown gear which is either rotated continuously or in stepwise manner and which can be manually rotated by a manual adjusting knob.

This invention relates to a video tape recording device and to the system thereof.

The video signals of television contain frequency about 200 times wider in range than the sound signals thereof, and hence it follows that the feed speed of magnetic tape over which is applied high sensitive magnetic material for recording video signals must necessarily be increased in proportion to the extended range of frequency. Consequently, under a recording system under which the tape is fed from one side to the other side an increase in the feed speed of the limited length of tape reduces the period of time allowable for the tape to record the sound and video signals recordable in such a degree in which the feed speed of the tape is increased.

There are therefore employed two methods under the conventional system referred to, one of said two methods being that the feed speed of tape is limited to approximately 20 cm. per second, the tape is enlarged in width to approximately 1 inch to 2 inches, more than two heads for video signals and sound signals are provided as a head for recording, reproducing and erasing and the signals are recorded by forming a video track widthwise of a broad tape over the overall width thereof and forming a sound track lengthwise thereof; and the other method being that the relative movement speed between the tape and the head is intended to increase in such a manner that signals are recorded by forming a video track slightly slopewise with respect to the transverse direction of the tape by the use of a rotary video head adapted to turn in a direction opposite to that in which the tape is fed.

The methods of the kind described, which are shown in one embodiment thereof in FIG. 7, make it necessary to provide a control track C for synchronizing the video track V with the sound track S, because the directions in which a sound track S and a video track V are recorded in a direction different from each other, and hence spaces sufficient to provide the control track C is required in such a degree that a further reduction must be made in the period of time allowable for recording signals to which reference was made previously. And provision of said control track C necessarily involves inclusion of a servo-circuit associated with the control track C in the mechanism of a tape recorder, and also the fact that the tape to be used is not an endless tape necessitates provision of a rewinding mechanism for reciprocating the tape. These two facts conspire to complicate the structure of the tape recorder in a substantial degree. On the other hand, such a method by which a single piece of tape is reciprocated not only makes it difficult to record or reproduce halfway but also greatly deteriorates a reproduced video tape at the reciprocation of the tape in time of reproduction and that so often that the perfect reproduction of an original video is impossible.

An object of this invention is to provide a recording device for video tape in which an endless tape is used as a magnetic recording tape and which allows sound and video signals to be received, recorded and reproduced over a long period of time without the use of a particularly broad tape.

Another object of the invention is to provide a recording device for video tape in which a control track for synchronizing signals as has been required conventionally is no more necessary but in which an effective area for recording signals is enlarged thereby to prolong the above-described period of time allowable for receiving signals.

Another object of the invention is to provide a recording device for video tape in which a control track can be dispensed with, thereby to remove a servo-circuit from the internal mechanism of a video tape recorder for simplification thereof.

Another object of the invention is to provide a recording device for video tape in which no tape-rewinding mechanism is required thereby to substantially simplify the mechanism of the video tape recorder of the kind described.

Still another object of the invention is to provide a recording device for video tape in which the use of an endless tape facilitates the midway reproduction of tape.

A still further object of the invention is to provide a recording device in which no separate arrangement of more than two heads for recording, reproducing, and erasing respectively of video signals and sound-synchronizing signals is required but two heads for video and sound signals can be compactly arranged in a common limited space through the use of an endless tape with a new track system.

The feature of this invention is that sound and video signals for television are recorded on an endless magnetic tape of a sufficient length widthwise thereof in the suitable number of sectioned tracks and that the sound signals and video signals are recorded in parallel on the tape lengthwise thereof in the form of one track continued sequentially from one end of the initial track of said sectioned tracks to the other end of the final track thereof, thereby making it possible for the endless tape to get recorded and reproduced several times as much as its real length can carry.

The invention will be more fully understood from the following description of a preferred embodiment thereof made with reference to the accompanying drawings in which.

Figure 1:
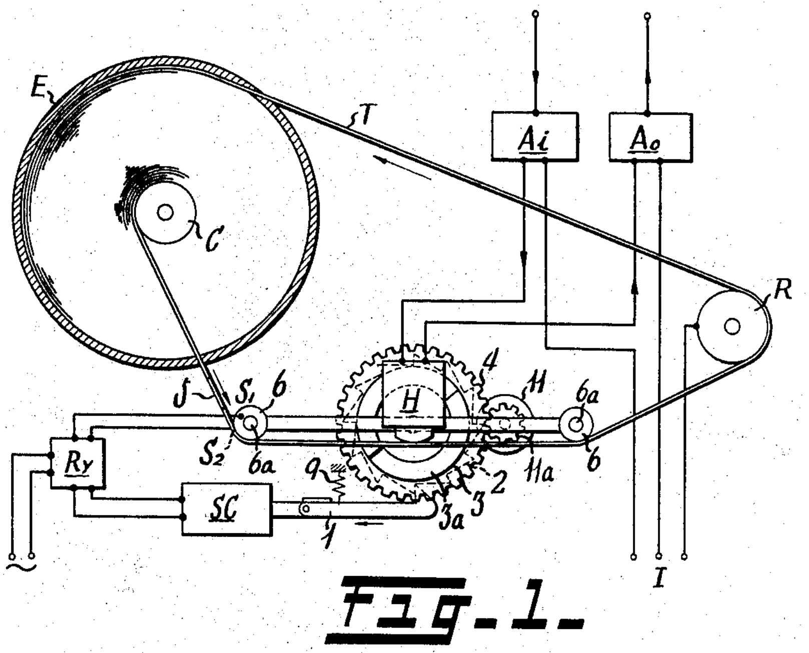
FIG. 1 is a plan view of a preferred embodiment of the invention.
Figure 2:
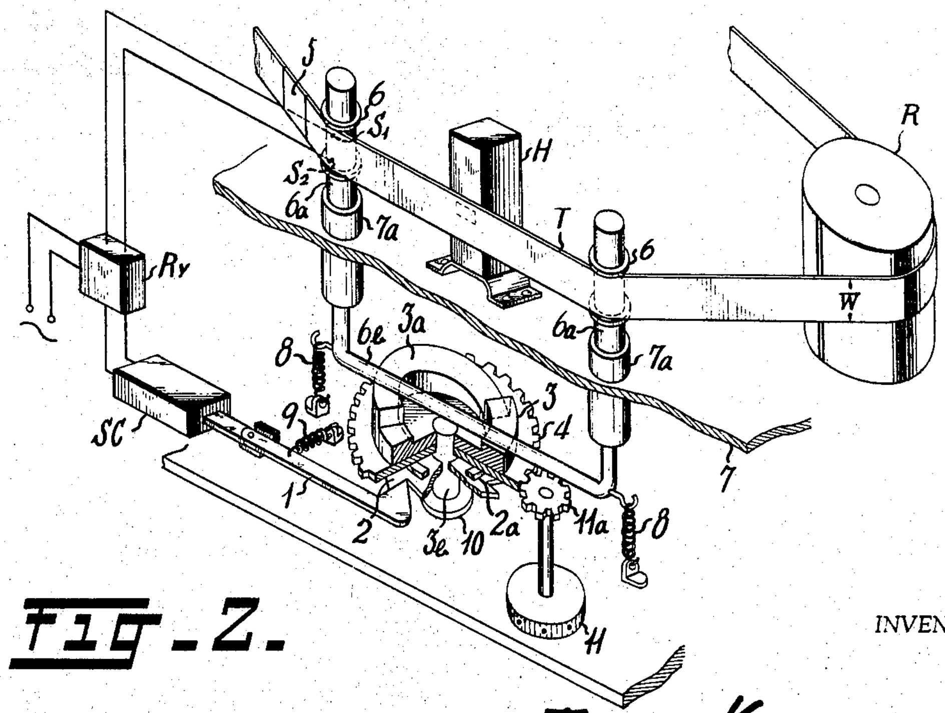
FIG. 2 is a perspective view illustrative of the driving mechanism of the embodiment shown in FIG. 1.

In FIGS. 1 and 2 the reference character E indicates a fixed case for an endless tape. The tape T is taken out from its reel C and fed through a tape guard 6, recording head H, another tape guard 6, then capstan R and back to the case E. The tape guards 6 and 6 on the right and left sides are elevated at each round of the endless tape T so as to form a second track right below the track previously formed. Recourse was had to the principles shown in the following embodiment for means for elevating the guard 6 at each turn of the tape T. In FIG. 1, a driving pawl is provided extendedly of a movable lever to a solenoid SC actuated through a relay Ry, said pawl rotating tooth by tooth a ratchet wheel 2 rotatably supported on a shaft **3*b* by the action of said solenoid SC. On the ratchet wheel 2 is fixedly provided a friction ring 2*a* on which is mounted a cam disc 3 having a pair of gently-sloping saw-tooth mill-cutter shaped cam surfaces 3*a* in a round symmetrical position so as to transmit the rotation of the ratchet wheel 2 to the cam disc 3 through the friction of the friction ring 2*a*, and an indexing toothed wheel 4 is fixed to the bottom of the cam disc 3. The endless tape T, a greater part of which is contained in the case E, continuously fed and rewound therewithin, is fed at high speed in a direction of an arrow shown in the drawings by means of a tape capstan R which rotates on the base plate 7 constituting the frame of the device. A conductor 5 is provided only at one place of the non-recording face (back side) of said tape T across the width thereof. One of the right and left tape guards 6 and 6 is provided with make and break contacts $S_1$ and $S_2$. As soon as said conductor 5 passes the tape guard provided with said contacts $S_1$ and $S_2$, it short-circuits the contacts $S_1$ and $S_2$ and actuates the relay Ry. Said right and left side tape guards 6 and 6 pass through the right and left side guard tubes 7*a* and 7*a* formed on the base plate 7 to which is fixed a head H, and are supported rotatably on the upper ends of movable poles 6*a* and 6*a* adapted to be freely moved up and down under the guidance of said tubes 7*a* and 7*a*. The lower ends of the movable poles 6*a* and 6*a* are connected integrally with each other by a cross bar 6*b* which is in contact with the sawtooth cam surfaces 3*a* of the cam disc 3, said cross bar 6*b* being urged against the cam surfaces 3*a* by means of a pull spring 8. Consequently, the tape guards 6 and 6 move upwardly and downwardly of the base plate 7 in proportion to the cam surfaces 3*a* of the cam disc when the cam disc 3** is rotated.

The height of the saw teeth of the cam surfaces **3*a* is made equal to the width of the endless tape T and the number of teeth of the ratchet wheel 2 is made equal to twice the number of sectioned track stages formed across the width of the tape T. The feed pawl 1 is designed to be recoiled by the action of a spring 9 when the solenoid SC is de-energized. The cam disc 3 has its spindle 3*b* pivoted at its lower end to the body (not shown) of this device through a thrust bearing 10. The indexing tooth wheel 4 is engaged by a small tooth wheel 11*a*, an index-attached knob 11 being attached to the end of the spindle of said small tooth wheel 11*a*. By turning said knob 11 can be freely rotated the cam disc 3 without any intervention of the ratchet wheel 2**, thereby enabling the tape T to move widthwise. When, for example, midway recording or reproducing of tape is intended, the operation described above is carried out.

Figure 3:
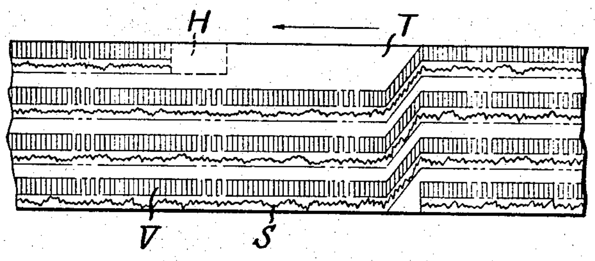
FIG. 3 is a view illustrating the structure of the track to be recorded on the tape by the device shown in FIG. 1.

Input of sound and video signals is given to a head H through an input amplifier A*i* and the output reproduced by the head H is given to an output through an output amplifier A*o*. The input amplifier A*i*, output amplifier A*o*, and tape capstan R are connected to a power source 1. When the endless tape T is turned by said tape capstan R, and thus, as soon as the conductor 5 provided on the non-recording surface of the endless tape T passes the tape guards 6 and 6 provided with contacts $S_1$ and $S_2$ at each turn of the tape T, the contacts $S_1$ and $S_2$ are short-circuited and actuate the relay Ry for energizing the solenoid SC. Consequently, the feed pawl 1 is pulled by the solenoid SC in a direction of an arrow, thereby to move the ratchet wheel 2 by one tooth. When the ratchet wheel 2 has been moved by one tooth, the cam disc 3 is also caused to move over a distance corresponding to one tooth of the ratchet wheel 2 through a friction ring **2*a*, with the result that a cross bar 6*b* is pushed upward by the cam surfaces 3*a* to a height corresponding to the angle of rotation of the cam disc 3, and accordingly the tape guards 6 and 6 too are pushed upward in cooperation with movable posts 6*a* and 6*a*, thereby to move upward an endless tape T with respect to a head H by one stage of the tracks of the endless tape T. That is to say, the endless tape T is turned in a direction of an arrow under the guidance of the tape guards 6 and 6** while being in contact wtih the head H, but the tape T moves upward by one stage of its tracks by the action of the above-described relay Ry. Consequently, a track S for sound signals and a track V for video signals as shown in FIG. 3 are formed parallelly and continuously on the tape T.

Thus, if the endless tape is sectioned across its width into suitable number of tracks and the shape of the cam disc 3 and the number of teeth of the ratchet wheel 2 are selected so as to correspond to the number of sectioned tracks, said section will be followed by the succeeding sections at each turn of the endless tape T thereby to increase the effective length of recording i.e., the length of track corresponding to the product of the substantial length of the endless tape T multiplied by said number of sectioned tracks. When the head H finished scanning the overall length of said sectioned tracks, the cross bar **6*b* drops from the highest position of the saw-tooth cam surfaces 3*a* to the lowest position thereof by the action of a pull spring 8**, thereby to move the scanning position or the head H corresponding to the endless tape back to the starting position in which the endless tape T was recorded and reproduced. When the scanning position was thus returned to the starting position, a known power switch mechanism or suitable limit switch may be used to automatically stop recording and reproducing or repeat reproducing.

The feed speed of the endless tape T must be sufficiently high as described. As an example may be cited the fact that video signals accompanied by sound signals could be continuously recorded on six tracks formed on an endless tape with a length of ¼ inch. By choosing the feed speed of tape at a rate of 5.5 m. to 5 m. per second, reproduction fidelity is obtained in such a degree as it is fit for practical use. If the width of endless tape to be used is ½ inch, recording is possible on 12 tracks. If, at this time, the tape speed is 3.6 m. per second and the overall length of the endless tape is 1,100 m., then continuous recording is made possible for a period of one hour. In an experiment made with the example described above, the reel used for the 1,100 m. long endless tape was 12 inches in outside diameter and 7 inches in spool diameter.

When an endless tape T is moved by driving roller R in the manner described, a relay Ry is actuated at each turn of the tape and the cam disc 3 is turned, an index-attached knob 11 is turned every moment by the indexing tooth wheel 4 and the small tooth wheel **11*a* and indicates the number of the tracks formed on the endless tape T which is just being scanned. When the index-attached knob 11 is manually turned, the cam disc 3 is forced to move against the friction of the friction ring 2*a* irrespective of the ratchet wheel 2, so that the relative position between the track of the endless tape T and the head H can be changed by operating the knob 11** thereby to make it possible not only to easily make recording or reproducing midway between the various track stages of the endless tape T, but also to make parallel recording of sound and video signals. Consequently, there is no necessity of providing such a synchronous control track as has been in conventional use to synchronize the video signals with the sound signals, with the result that the effective recording area of tape is increased and a head for sound signals and that for video signals can be compactly contained in a small space, and hence a video tape recorder can be simplified in structure and reduced in size, thereby to obtain wide use from general families and also to reduce a possibility of the recorder getting out of order because of simplified operation. Since an endless tape is used, no rewinding of the tape is required.

Figure 6:
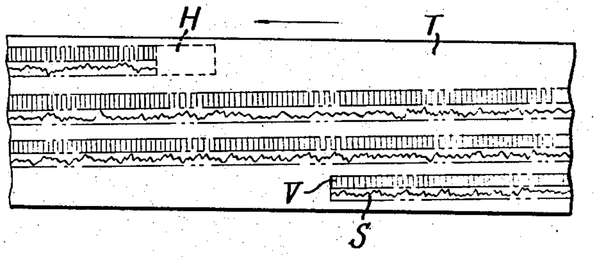
FIG. 6 is a front elevation of the track to be recorded by the device shown in FIG. 4.
Figure 7:
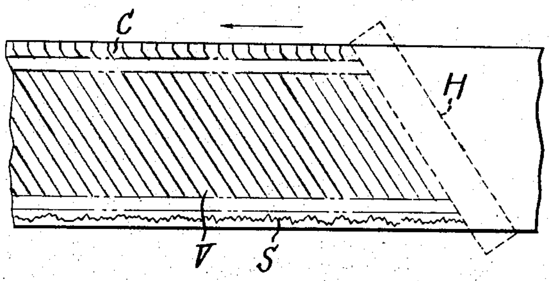
FIG. 7 is a front elevation of the track of a video tape in conventional use.
Figure 4:
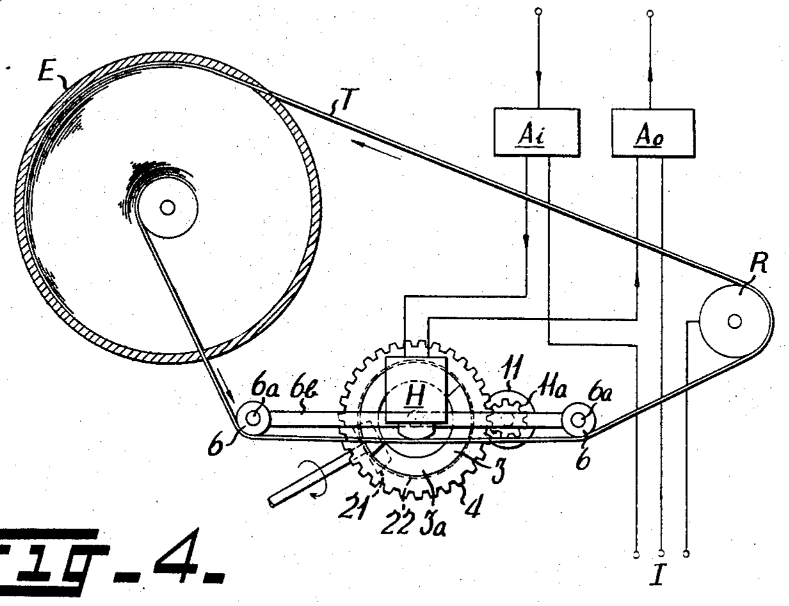
FIG. 4 is a plan view of a preferred modification of the invention.
Figure 5:
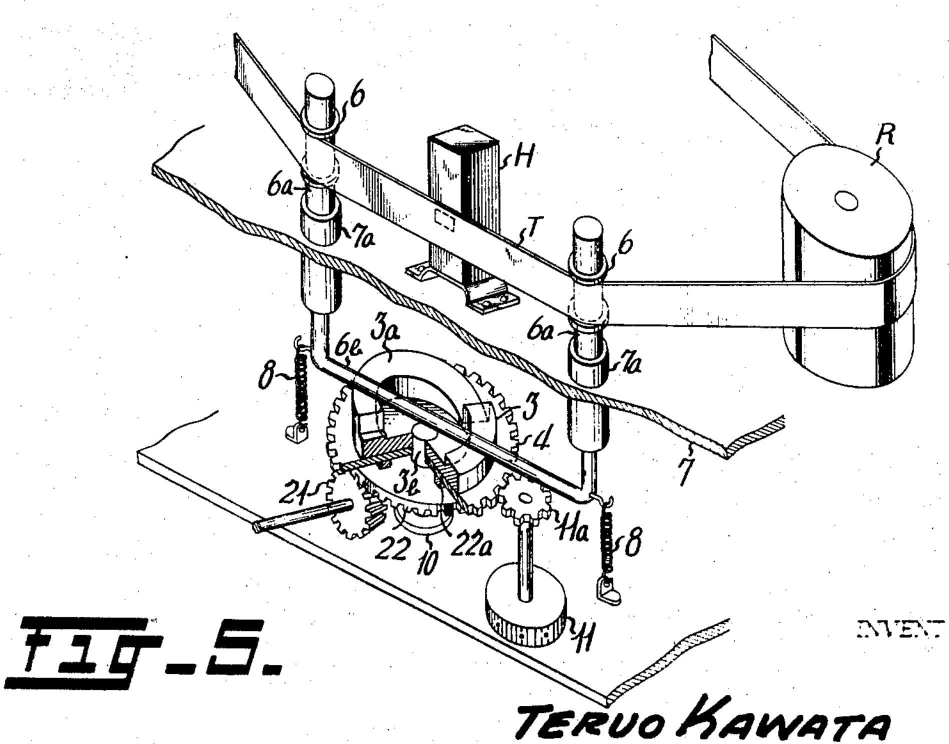
FIG. 5 is a perspective view of the tape driving mechanism of the embodiment of FIG. 4.

Shown in FIGS. 4 or 6 is a modification in which the driving mechanism associated with the cam disc 3 is modified with respect to the embodiment shown in FIG. 1 or 3 in such a manner that sound track S and video track V to be formed on the endless tape T are not continued in the form of a staircase like the embodiment shown in FIG. 1 or 3 but are formed so as to be involutedly continued. To avoid a repetition of description like reference characters are used for representation of parts equivalent to the embodiment shown in FIG. 1 or 3.

Driving of the cam disc 3 which moves in response to the driving roller R actuating the endless tape T brings a proportionately continuously rotating pinion 21 into mesh with a crown gear 22, causes the cam disc 3 to ride on a friction ring **22*a* fixedly provided on said crown gear and continuously turns the cam disc 3 through the friction of the friction ring 22*a*. The height of the saw-tooth cam surfaces 3*a* of the cam disc 3 is equivalent to the width of the endless tape T as described previously in conjunction with the embodiment shown in FIG. 1 or 3. Because the cam disc 3 is rotated continuously unlike that of the previously described embodiment which is rotated on and off, the speed of revolution of the cam disc 3 must be calculated in such a manner that the time required for the endless tape T to cause the overall length of the tracks formed thereon to be scanned by the head H correspond to the time required for the disc 3 to turn half a round. There is no necessity of providing the endless tape with such a conductor 5 as shown in the embodiment in FIG. 1 or 3. The explanation is that track to be formed on the endless tape T in this case is involutedly formed as will be hereinafter described. Consequently, there is not only no need for providing one of tape guards 6 and 6** with contacts $S_1$ and $S_2$ but also no need of such a relay Ry and a solenoid SC as are shown in FIG. 1 or 3.

As soon as the endless tape T begins running by starting a capstan R, a pinion 21 begins to turn and a cam disc 3 also begins to turn through a crown gear 22 and a friction ring **22*a*. When the cam disc 3 begins to turn, a cross bar 6*b* in contact with saw-tooth cam surfaces 3*a* is pushed up to a height in proportion to the angle of rotation of the cam disc 3, right and left movable poles 6*a* and 6*a* integrally extending to both ends of the cross bar 6*b* and tape guards 6 and 6 rotatably provided on the upper ends of said poles 6*a* and 6*a* are elevated, and the endless tape T also is moved upward by very small degrees in proportion to its amount of travelling, thereby to gradually change the relative position widthwise of the endless tape T between the tape T and the head H. If in the manner described the running of the endless tape is continued, it will be understood that the tracks of sound and video signals S and V to be recorded on the endless tape T are continued in parallel and involutedly as shown in FIG. 6. That is to say, when scanning of several involute tracks has been finished, the cross bar 6*b*** drops from the highest position to the lowest at which time a power switch or other suitable limit switch is actuated to stop the running of the endless tape T. In consequence, reduction of said involute tracks to the minimum of requirement can lengthen the overall effective length of track to several times more than the actual length of the endless tape T, with the result that a tape of small width such as ¼ or ½ inch wide can provide a video tape which can fully answer the practical purpose in substantially the same manner as is the case with the embodiment shown in FIG. 1 or 3. As described, it will easily be understood from the above description that in the embodiments shown the endless tape is moved widthwise thereof with respect to the head H but the head can be instead moved widthwise of the tape with respect to the tape T by connecting the head to the cam disc.

While the invention has been described with reference to what is presently considered to be the preferred embodiments of the invention, it is to be understood by those skilled in the art that various changes and modifications can be made therein without departing from the scope and spirit of the invention.

I claim:

1. A video tape recording device comprising an endless magnetic recording tape capable of recording sound and video signals, stationary heads supported on a stationary base and capable of recording, reproducing and erasing said sound and video signals on said tape, a right tape guard and a left tape guard supported on movable poles on the right and left sides of said heads for moving the guards with respect to the base and for bringing the heads into contact with a portion of the recording surface of the endless tape when the endless tape extends between the tape guards, rotary driving means supported on said stationary base for causing the endless tape to move across the stationary heads in contact with said stationary heads at a high speed in a longitudinal direction, a rotatable cam disc drivingly connected to said poles for shifting said poles and that portion of the tape extending between the guards transversely with respect to the tape, and means for rotatably driving said cam disc in synchronization with the movement of said endless magnetic recording tape in response to the movement of said tape with said means for rotating said cam disc including a ratchet wheel drivingly connected to said cam disc by means of a friction ring engaging a rotary gear coaxially attached to said cam disc.

2. The invention of claim 1 additionally including manually rotatable setting means engaging said gear for rotating said gear to consequently position said cam disc and said tape guards.

3. The invention of claim 2 wherein said means for rotating said cam disc includes a solenoid pawl engaging said ratchet and actuable by said solenoid for rotating said friction ring upon actuation of said solenoid.

4. A video tape recording device comprising an endless magnetic recording tape capable of recording sound and video signals, stationary heads supported on a stationary base and capable of recording, reproducing and erasing said sound and video signals on said tape, a right tape guard and a left tape guard supported on movable poles on the right and left sides of said heads for moving the guards with respect to the base and for bringing the heads into contact with a portion of the recording surface of the endless tape when the endless tape extends between the tape guards, rotary driving means supported on said stationary base for causing the endless tape to move across the stationary heads in contact with said stationary heads at a high speed in a longitudinal direction, a rotatable cam disc drivingly connected to said poles for shifting said poles and that portion of the tape extending between the guards transversely with respect to the tape, and means for rotatably driving said cam disc in synchronization with the movement of said endless magnetic recording tape in response to the movement of said tape with said means for rotating said cam disc including a friction ring engaging a rotary crown gear coaxially attached to said cam disc.

5. The invention of claim 4 wherein said means for rotating said cam disc additionally includes a pinion driven with a fixed speed of rotation with respect to a driving roller forming a portion of said driving means for causing the endless tape to move across the stationary heads in contact with said stationary heads at a high speed in a longitudinal direction.

References Cited

UNITED STATES PATENTS

| | | |
|---|---|---|
| 2,275,961 | 3/1942 | Heller. |
| 2,468,198 | 4/1949 | Heller. |
| 3,149,207 | 9/1964 | Maxey. |
| 3,265,816 | 8/1966 | Herterich. |

ROBERT L. GRIFFIN, Primary Examiner

D. E. STOUT, Assistant Examiner

U.S. Cl. X.R.

178—6.6